United States Patent
Reuter et al.

[11] Patent Number: 5,100,114
[45] Date of Patent: Mar. 31, 1992

[54] ELASTIC BEARING

[75] Inventors: Horst Reuter, Wachtberg-Oberbachem; Wilhelm Mayerböck, Kirchdaun, both of Fed. Rep. of Germany

[73] Assignee: Boge AG, Eitorf, Fed. Rep. of Germany

[21] Appl. No.: 572,493

[22] Filed: Aug. 23, 1990

[30] Foreign Application Priority Data

Sep. 4, 1989 [DE] Fed. Rep. of Germany ....... 3929338

[51] Int. Cl.[5] ..................... F16C 33/00; B60G 11/22; F16F 1/42
[52] U.S. Cl. ................................ 267/293; 267/141.2; 280/717; 403/225; 384/292; 384/297
[58] Field of Search ............ 267/293, 276, 281, 141.2, 267/140.4, 140.1 C, 140.5; 188/293, 307; 280/716, 671, 717; 403/225, 226, 228, 221; 384/291, 292, 286, 297, 293

[56] References Cited

U.S. PATENT DOCUMENTS

| | | | |
|---|---|---|---|
| 1,132,759 | 3/1915 | Bache | 384/292 |
| 1,882,956 | 10/1932 | Sandler | 384/293 |
| 3,300,257 | 1/1967 | Selker et al. | 384/292 X |
| 3,604,771 | 9/1971 | Luzsicza et al. | 384/125 |
| 3,608,927 | 9/1971 | Grosseau | 280/716 |
| 3,976,342 | 8/1976 | Leyendecker et al. | 384/293 |
| 4,671,678 | 6/1987 | Münch | 384/297 X |
| 4,678,348 | 7/1987 | Tielemans et al. | 384/292 X |

FOREIGN PATENT DOCUMENTS 1203637 4/1958 France .................. 403/228

Primary Examiner—Douglas C. Butler
Assistant Examiner—Josie A. Ballato
Attorney, Agent, or Firm—Nils H. Ljungman & Associates

[57] ABSTRACT

Elastic bearing comprising an inner bushing and an outer bushing located at some distance from it, and an elastic part inserted between them, whereby between the elastic part and at least one surface of one of the bushings, there is lubricant in a cavity, the bushings and elastic part being rotatable relative to one another. To increase the useful life and to guarantee correct lubrication, in the cavity the elastic part has elevations on its surface, which are arranged to guarantee a proper distribution of the lubricant.

6 Claims, 1 Drawing Sheet

ELASTIC BEARING

BACKGROUND OF THE INVENTION

1. Field of the Invention

This invention relates to an elastic or resilient bearing comprising an inner bushing and an outer bushing located at some distance from it, and an elastic or resilient part inserted between them, and more particularly to an elastic or resilient bearing wherein between the elastic part and at least one surface of one of the bushings, there is lubricant in a cavity.

2. Background Information

The prior art discloses elastic bearings for the elastic mounting of axle members and other equipment in motor vehicles (e.g. EP-OS 0.226.702, U.S. Pat. No. 3,604,771), which consist of metal sleeves located one inside the other, and between which elastomer springy bodies are inserted. The springy body thereby has ring-shaped recesses to hold lubricant on its outer surface facing a metal sleeve. Practical experience has shown that a disadvantage of this arrangement, when the spring body is axially installed inside the metal sleeve, is that the lubricant is partly displaced and may even be forced out. That is because ring-shaped lubricant pockets are formed by the ring-shaped beads, which displace some of the lubricant during axial installation, so that it collects primarily in the final ring-shaped recess. During operation of the motor vehicle, the region pulled on first during the assembly sometimes or often has less lubricant than the remaining regions.

Moreover, in the event of torsion stresses, on account of the ring-shaped elevations, the principal stress is sometimes or often applied to the same contact surfaces of the elastic part and/or of the metal sleeves. Since, the lubricant film on the contact surfaces is not replaced, a high degree of wear occurs.

OBJECT OF THE INVENTION

The object of the invention is to refine the design of an elastic bearing so as to improve the cavity containing the lubricant, whereby a uniform lubrication of the bushings is achieved. Thus by applying the load to practically the entire sliding surface, the life of the bearing is increased.

SUMMARY OF THE INVENTION

This object is achieved by means of the invention, in that for the formation of the cavity, the elastic part thereof preferably has elevations on its surface, and that the end of the elastic part is sealed off from the bushing facing the elevations. In this embodiment, it is advantageous that after the assembly of the elastic body into the bushing, if the lubricant collects in a partial section on account of the elastic deformation during assembly, it can then be distributed over the entire surface of the cavity. The lubricant can be correspondingly distributed over the surface in each direction, around and past the elevations. This results preferably in correct lubrication during operation, and thus contributes to extending the useful life of the bearing. It is particularly favorable that practically the entire surface is loaded as a sliding surface during operation, thereby reducing wear. This produces a particularly favorable result if the metal surface is covered with a coating such as that in U.S. Pat. No. 3,604,771.

In an alternate embodiment of the invention, the elevations seen from overhead are in the form of V-shaped nubs or cross-shaped nubs. With the V-shaped or cross-shaped configuration of the nubs, it is advantageous that lubricant accumulates in the current direction of rotation of the elastic part in relation to the bushing, which during the further rotation of the bushing also forcibly lubricates the contact surface of the partial elevations.

To achieve a particularly favorable load-bearing contact of the elastic part against the bushing, in one embodiment of the invention there are several rows of elevations distributed around the circumference.

The elevations are thereby advantageously offset from one another in at least one direction.

In an alternate embodiment there is a ring-shaped bead for sealing purposes on the end of the elastic part.

In a particularly favorable embodiment, one end of a bushing is angled, whereby the end surface of the elastic part facing the angled end of the bushing is designed as a gasket or seal. In an additional embodiment of the invention, there are elevations on the end surface of the elastic part.

Alternatively, the object of the invention is achieved by an embodiment having a cavity that consists of at least one spiral-shaped lubricant containing a channel running over the surface.

One aspect of the invention resides broadly in a resilient bearing, for providing rotary motion, such as for vehicle suspension systems, the resilient bearing comprising in combination: a tubular inner member and a tubular outer member concentrically disposed about the inner member; the inner and outer members each having inner and outer surfaces; a rotational load-transmitting elastomeric body arrangement at least partially compressed between the inner and the outer members; the body arrangement comprising at least one circumferential surface; the at least one circumferential surface of the bushing being at least partially secured at least one of: the outside surface of the inner member; and the inside surface of the outer member; at least one of the circumferential surfaces having at least one lubricant retaining space facing its adjacent member; the at least one space having a surface disposed towards the adjacent of the members; arrangement for projecting from the at least one surface of the at least one space being disposed towards the adjacent of the members; the projecting arrangement being configured for retaining lubricant at least partially therearound during rotary motion of at least one of the members with respect to the other of the members; a lubricant at least partially filling the at least one space; and arrangement for sealing the lubricant in the at least one space.

Another aspect of the invention resides broadly in the resilient bearing, wherein the projecting arrangement comprise a plurality of projections which are distributed over a substantial portion of the surface of the at least one space.

Yet another aspect of the invention resides broadly in the resilient bearing, wherein the projections comprise at least one of: nubs, loops and tufts.

A further aspect of the invention resides broadly in the resilient bearing, wherein the projections comprise V-shapes.

A yet further aspect of the invention resides broadly in the resilient bearing, wherein the projections comprise cross-shaped nubs.

Yet another further aspect of the invention resides broadly in the resilient bearing, wherein the surface of the at least one space is circumferential and the projections are distributed circumferentially over the surface of the at least one space.

An additional aspect of the invention resides broadly in the resilient bearing, wherein the surface of the at least one space is circumferential and the projections are distributed circumferentially over the surfae of the at least one space.

A yet additional aspect of the invention resides broadly in the resilient bearing, wherein the projections are disposed in a plurality of rows.

A further additional aspect of the invention resides broadly in the resilient bearing, wherein the projections are disposed in a plurality of rows.

A yet further additional aspect of the invention resides broadly in the resilient bearing, wherein the projections in the rows are offset from one another in at least one direction.

Another further additional aspect of the invention resides broadly in the resilient bearing, wherein the projections in the rows are offset from one another in at least one direction.

A yet another additional aspect of the invention resides broadly in the resilient bearing, including a ring-shaped bead for sealing the lubricant in the at least one space; and the bead being located on a first end of the elastomeric bearing.

Another yet further aspect of the invention resides broadly the resilient bearing, including a ring-shaped bead for sealing the lubricant in the at least one space; the bead being located on a first end of the elastomeric body arrangement.

A still further aspect of the invention resides broadly in the resilient bearing, wherein one end the bearing is angled, the elastomeric body arrangement including a seal arrangement; the seal arrangement being disposed at the angled end of the bearing.

A still further additional aspect of the invention resides broadly in the resilient bearing, wherein the seal arrangement comprises at least one of: a gasket and a seal.

Another still further additional aspect of the invention resides broadly in the resilient bearing, wherein the bearing comprises a substantial cylindrical portion and a projecting portion; the at least one space comprising a plurality of spaces at least one of the plurality of spaces being disposed in the projecting portion.

Yet another still further additional aspect of the invention resides broadly in the resilient bearing, wherein the bearing comprises a substantial cylindrical portion and a projecting portion; the at least one space comprising a plurality of spaces at least one of the plurality of spaces being disposed in the projecting portion.

Still another yet further additional aspect of the invention resides broadly in the resilient bearing, wherein the projecting arrangement is configured to form at least one spirally shaped channel.

Another still further yet additional aspect of the invention resides broadly in the resilient bearing, wherein the projecting arrangement is configured to form at least one spirally shaped channel.

Another aspect of the invention resides broadly in the resilient bearing, wherein the projecting arrangement is configured to form at least one spirally shaped channel.

Yet another aspect of the invention resides broadly in the resilient bearing, wherein the inner and outer member are metal; the surface of the member adjacent the at least one space is covered with a coating; and the projecting arrangement extending and touching the coating.

Preferred embodiments of the invention are schematically illustrated in the accompanying figures.

DESCRIPTION OF THE PREFERRED EMBODIMENT

Figure 1:
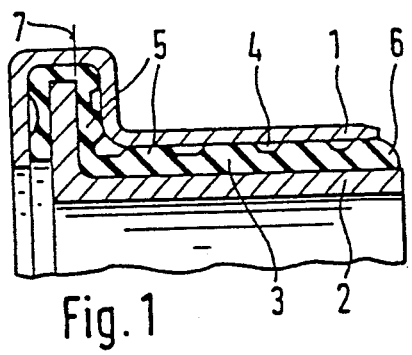
FIG. 1 shows an elastic bearing consisting of two bushings and one elastic part in cross section.

The elastic bearing illustrated in FIG. 1 consists essentially of an inner bushing 2 and an outer bushing 1 located at some distance from the inner bushing 2. An elastic part 3 such as rubber or an other appropriate elastomer is inserted between the two bushings 1 and 2. On the surface of the elastic part 3, a cavity 4 is formed opposite to the surface disposed against the inner bushing 2 and against the inner surface of the outer bushing 1. The cavity 4 is used to hold lubricant. The outer surface of the elastic part 3 has elevations 5 extending into the cavity 4. The elevations 5 preferably are in contact with the bushing 1 to achieve sufficient load-bearing capability. Between the two bushings 1 and 2, the cavity 4 is preferably sealed toward one end by a bead 6.

The elastic bearing illustrated in FIG. 1 has a bushing 2, whose end is preferably angled, whereby the elastic part 3 is also preferably angled, and also has elevations 5 on the end surface 7.

Figure 2:
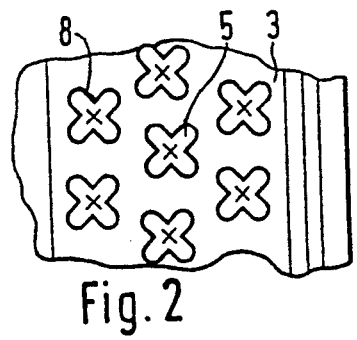
FIG. 2 shows a detail of an elastic part, in an overhead view.

FIG. 2 shows a portion of the surface of the elastic part 3 in detail, whereby the elevations 5 can be seen in the form of V-shaped or cross-shaped nubs. These V-shaped or cross-shaped nubs have the advantage that when the elastic part 3 is rotated in the circumferential direction, lubricant can be trapped in the corners 8 of the elevations 5 and, when the elastic part 3 is further rotated, the lubricant can also be allowed to flow to the elevations 5 themselves. On account of the additional offset arrangement of several rows of elevations, not only is a lubrication of the entire surface substantially assured, since the lubricant can constantly be distributed over the corresponding surface, but the lubrication of the elevations 5 themselves is preferably favorably influenced by the geometric shape of the elevations 5. A bead 6, such as illustrated in FIG. 1, is usually necessary to provide a seal between the bushings and the cavity 4.

Figure 3:
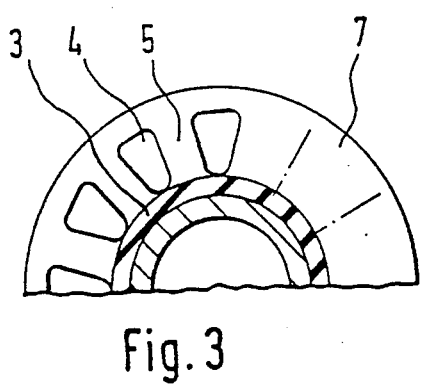
FIG. 3 shows an end surface of an angled elastic part with elevations taken along line III—III of FIG. 4.

FIG. 3 shows the end surface 7 of the elastic part 3, whereby elevations 5 may also used to form a cavity or cavity 4 to hold lubricants.

Figure 4:
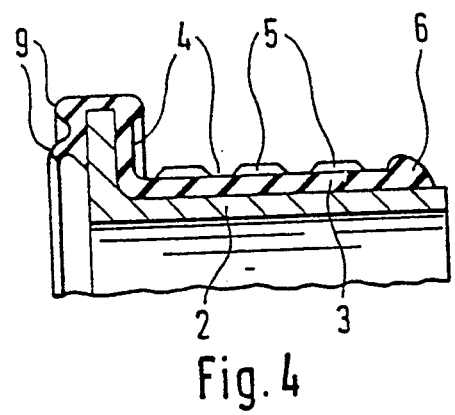
FIG. 4 shows a detail of an inner bushing together with an elastic part in cross section.

FIG. 4 shows a detail of a bushing 2, wherein there are elevations 5 on the surface of the elastic part 3, and there is a bead 6 to provide a seal on the one end. On the angled end, the elastic part 7 can be installed around that end, so that corresponding sealing functions are often performed by additional beads such as beads 9.

Figure 5:
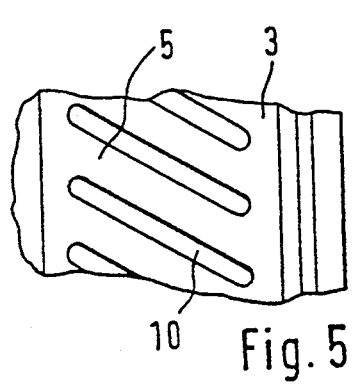
FIG. 5 shows an overhead view of a spiral shaped arrangement of elevations.

FIG. 5 illustrates an embodiment in which the partial elevations 5 in the elastic part 3 run in a spiral or helical or partially helical fashion. It is also possible that instead of the elevations 5, there are one or more channels 10 on the surface of the elastic part.

Figure 6:
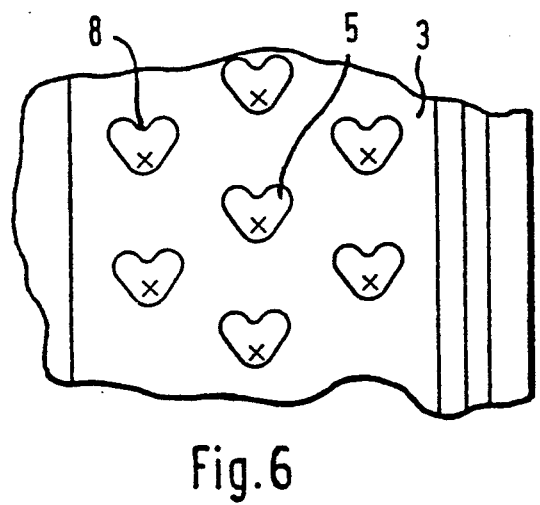
FIG. 6 shows a detail of an elastic part, in an overhead view.

FIG. 6 shows an alternative embodiment with V-shaped elevations 5 comprised solely of two arms forming an angle with one another and being joined at an apex, the two arms substantially defining a plane containing the two arms and the plane of the V-shape being disposed substantially tangential to the circumferential surface of the elastomeric body; 1. Bushing (outer); 2. Bushing (inner); 3. Elastic part; 4. Cavity; 5. Elevations; 6. Bead; 7. End surface; 8. Corners; 9. Beads; 10. Channel.

In summary, one feature of the invention resides broadly in an elastic bearing comprising an inner bushing and an outer bushing located at some distance from it, and an elastic part inserted between them, whereby between the elastic part and at least one surface of one of the bushings, there is lubricant in a cavity, characterized by the fact that to form the cavity 4, the elastic part 3 has partial elevations 5 distributed over its surface, and by the fact that the end of the elastic part 3 is sealed off from the region facing the partial elevations 5.

Another feature of the invention resides broadly in an elastic bearing characterized by the fact that the partial elevations 5 are nubs or loops or tufts which are V-shaped when viewed from overhead.

Yet another feature of the invention resides broadly in an elastic bearing characterized by the fact that the partial elevations 5 are cross-shaped nubs when viewed from overhead.

A further feature of the invention resides broadly in an elastic bearing characterized by the fact that several rows of partial elevations 5 are distributed over the circumference.

A yet further feature of the invention resides broadly in an elastic bearing characterized by the fact that the partial elevations 5 are offset from one another in at least one direction.

Yet another further feature of the invention resides broadly in an elastic bearing characterized by the fact that a ring-shaped bead 6 for sealing is located on the end of the elastic part 3.

An additional feature of the invention resides broadly in an elastic bearing characterized by the fact that one end of a bushing 1, 2 is angled, whereby the end surface 7 of the elastic part 3 facing the angled end of the bushing 1, 2 is designed as a gasket or seal.

A yet additional feature of the invention resides broadly in an elastic bearing characterized by the fact that there are elevations 5 on the end surface 7 of the elastic part 3.

A further additional feature of the invention resides broadly in an elastic bearing comprising an inner bushing and an outer bushing located at some distance from it, and an elastic part inserted between them, whereby between the elastic part and at least one surface of one of the bushings, there is lubricant in a cavity, characterized by the fact that the cavity 4 consists of at least one channel 1 running in a spiral fashion over the surface, and/or at least one elevation 5 running in a spiral fashion.

All, or substantially all, of the components and methods of the various embodiments may be used with at least one embodiment or all of the embodiments, if any, described herein.

All of the U.S. patents, U.S. patent applications and U.S. publications recited herein, if any, are hereby incorporated by reference as if set forth in their entirety herein.

The details in the U.S. patents, U.S. patent applications and U.S. publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A resilient bearing, for responding to rotary motion, such as in vehicle suspension systems, said resilient bearing comprising in combination;
   a tubular inner member and a tubular outer member concentrically disposed about the inner member;
   said inner and outer members each having inner and outer surfaces;
   a rotational load-transmitting elastomeric body means at least partially compressed between said inner and said outer members;
   said body means comprising at least one circumferential surface;
   said at least one circumferential surface of the body being at least partially in contact with one of:
   the outside surface of the inner member and
   the inner surface of the outer member;
   at least one of said circumferential surfaces having at least one lubricant retaining space facing its adjacent member;
   means for projecting from said at least one circumferential surface being disposed towards said adjacent member;
   said projecting means being configured for retaining lubricant at least partially therearound during rotary motion of at least one of said adjacent members with respect to the other of said adjacent members;
   said projecting means comprising at least one projection, said at least one projection comprising a V-shape, said each V-shape comprising solely two arms forming an angle with one another and being joined at an apex, said two arms substantially defining a plane containing said two arms, and said of said V-shape being disposed substantially tangential to said circumferential surface;
   a lubricant at least partially filling said at least one space; and
   means for sealing said lubricant in said at least one space.

2. The resilient bearing according to claim 1, wherein said at least one projection comprises a plurality of projections which are distributed over a substantial portion of said at least one circumferential surface.

3. The resilient bearing according to claim 2, wherein said projections comprise nubs.

4. The resilient bearing according to claim 3, wherein said projections are disposed in a plurality of rows.

5. The resilient bearing according to claim 4, wherein said projections in said rows are offset from one another in at least one direction.

6. The resilient bearing according to claim 5, including a ring-shaped bead for sealing said lubricant in said at least one space; and said bead being located on a first end of said resilient bearing.

* * * * *

UNITED STATES PATENT AND TRADEMARK OFFICE
CERTIFICATE OF CORRECTION

PATENT NO. : 5,100,114

DATED : March 31, 1992

INVENTOR(S) : Horst REUTER and Wilhelm MAYERBÖCK

It is certified that error appears in the above-identified patent and that said Letters Patent is hereby corrected as shown below:

In column 6, line 46, after the second occurrence of 'said', insert --plane--.

Signed and Sealed this

Seventh Day of December, 1993

BRUCE LEHMAN

*Attest:*

*Attesting Officer*  *Commissioner of Patents and Trademarks*